Patented May 27, 1952

2,598,333

UNITED STATES PATENT OFFICE 2,598,333

N-THIO BIS N-TETRAHYDROFURFURYL- AND TETRAHYDROTHENYL-AMINES

Richard O. Zerbe, Nitro, W. Va., assignor to Monsanto Chemical Company, St. Louis, Mo., a corporation of Delaware No Drawing. Application September 29, 1950, Serial No. 187,700

7 Claims. (Cl. 260—345)

This invention relates to a class of new chemical compounds. More particularly it relates to sulfides of tetrahydrofurfuryl and tetrahydrothenylamines. These products are valuable intermediates, vulcanizing agents for elastomers and adjuvants for mineral oil lubricating compositions.

The compounds of this invention possess the structure

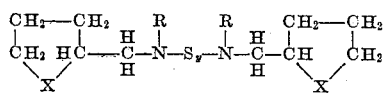

where X is an element of group VI of the periodic table having an atomic weight less than 33, R is an alkyl or alicyclic radical and $y$ in an integer.

These compounds may be prepared by the action of sulfur halides on the corresponding amine. The latter are in turn produced by hydrogenation of the Schiff's base resulting from condensing alpha furfuraldehyde or alpha thiophenaldehyde with an aliphatic or aromatic amine. The monosulfides are formed by condensation of two moles of the amine with one of sulfur dichloride. Substitution of sulfur monochloride for the dichloride results in the formation of disulfides. Higher ratios of sulfur halide result in the formation of higher sulfides. For example, a tetrasulfide is formed by condensing equimolecular quantities of the amine and sulfur monochloride. The higher sulfides may be mixtures of compounds containing different ratios of sulfur and are therefore of somewhat indefinite composition. However, it is possible to prepare higher sulfides which by analysis indicate that at least four atoms of sulfur link two amino radicals.

Typical examples of the new class of compounds are N,N'-monothio-bis-N-methyl tetrahydrofurfurylamine, N,N' - dithio-bis-N-methyl tetrahydrofurfurylamine, N,N'-tetrathio-bis-N-methyl tetrahydrofurfurylamine, N,N' - monothio-bis-N-ethyl tetrahydrofurfurylamine, N,N'-dithio - bis - N - ethyl tetrahydrofurfurylamine, N,N' - tetrathio-bis-N-ethyl tetrahydrofurfurylamine, N,N'-monothio - bis - N - isopropyl tetrahydrofurfurylamine, N,N' - dithio - bis - N - isopropyl tetrahydrofurfurylamine, N,N'-tetrathio-bis-N-isopropyl tetrahydrofurfurylamine, N,N'-monothio-bis-N-butyl tetrahydrofurfurylamine, N,N' - dithio - bis - N - butyl tetrahydrofurfurylamine, N,N'-tetrathio-bis-N-butyl tetrahydrofurfurylamine, N,N'-monothio-bis-N-amyl tetrahydrofurfurylamine, N,N'-dithio - bis - N - amyl tetrahydrofurfurylamine, N,N'-tetrathio-bis-N-amyl tetrahydrofurfurylamine, N,N'-monothio-bis - N - methyl tetrahydrothenylamine, N,N'-dithio - bis - N - methyl tetrahydrothenylamine, N,N'-tetrathio-bis-N-methyl tetrahydrothenylamine, N,N'-monothio-bis-N-ethyl tetrahydrothenylamine, N,N' - dithio - bis - N - ethyl tetrahydrothenylamine, N,N' - tetrathio-bis-N-ethyl tetrahydrothenylamine, N,N' - monothio-bis-N-isopropyl tetrahydrothenylamine, N,N'-dithio-bis-N-isopropyl tetrahydrothenylamine, N,N'-tetrathio - bis - N - isopropyl tetrahydrothenylamine, N,N'-monothio-bis-N-butyl tetrahydrothenylamine, N,N' - dithio - bis - N - butyl tetrahydrothenylamine, N,N' - tetrathio-bis-N-butyl tetrahydrothenylamine, N,N' - monothio-bis-N-amyl tetrahydrothenylamine, N,N'-dithio-bis-N-amyl tetrahydrothenylamine, N,N'-tetrathio-bis-N-amyl tetrahydrothenylamine, N,N'-monothio-bis-N-cyclohexyl tetrahydrofurfurylamine, N,N'-dithio - bis - N - cyclohexyl tetrahydrofurfurylamine, N,N'-tetrathio-bis-N-cyclohexyl tetrahydrofurfurylamine, N,N' - monothio - bis - N-cyclohexyl tetrahydrothenylamine, N,N'-dithio-bis-N-cyclohexyl tetrahydrothenylamine, N,N'-tetrathio-bis - N - cyclohexyl tetrahydrothenylamine, N,N'-monothio-bis-N-methyl cyclohexyl tetrahydrofurfurylamine, N,N' - dithio - bis-N-methyl cyclohexyl tetrahydrofurfurylamine, N,N'-tetrathio-bis-N-methyl cyclohexyl tetrahydrofurfurylamine, N,N' - monothio - bis-N-methyl cyclohexyl tetrahydrothenylamine, N,N'-dithio - bis - N - methyl cyclohexyl tetrahydrothenylamine, N,N'-tetrathio-bis-N-methyl cyclohexyl tetrahydrothenylamine, N,N' - monothio bis - N - ethyl cyclohexyl tetrahydrofurfurylamine, N,N'-dithio-bis-N-ethyl cyclohexyl tetrahydrofurfurylamine, N,N'-tetrathio-bis-N-ethyl cyclohexyl tetrahydrofurfurylamine, N,N'-monothio-bis-N-ethyl cyclohexyl tetrahydrothenylamine, N,N'-dithio-bis-N-ethyl cyclohexyl tetrahydrothenylamine, and N,N'-tetrathio-bis-N-ethyl cyclohexyl tetrahydrothenylamine.

Example 1

As a specific example illustrating in detail the preparation of the new compounds N,N'-dithio-bis-N-cyclohexyl tetrahydrofurfurylamine was prepared by reaction in an organic solvent inert to sulfur halide. Substantially 183 parts by weight of N-cyclohexyl tetrahydrofurfurylamine were dissolved in 440 parts by weight of benzene and to the solution so prepared a solution of 35 parts by weight of $S_2Cl_2$ in 44 parts by weight of benzene was added gradually while keeping the temperature of the reaction mixture in the range of 5–9° C. The reaction mixture was stirred for a short time after completing the addition and the by-product amine hydrochloride salt removed by filtration and washed with benzene. The solvent was removed from the filtrate and washings by distillation. The product consisted of a red syrup which partially crystallized on standing. The yield was substantially quantitative. Analysis for sulfur gave 15.0% as compared to a calculated value of 14.95% and analysis for nitrogen gave 6.58% as compared to a calculated value of 6.54%. The product was soluble in common solvents such as ether, acetone, alcohol, ethyl acetate, chloroform, heptane and benzene.

The monosulfide is readily formed by replacing the sulfur monochloride with substantially 26 parts by weight of sulfur dichloride in the foregoing procedure. N,N'-thio-bis-N-cyclohexyl tetrahydrofurfurylamine was also a red syrup.

As illustrative of the preparation of higher sulfides the proportion of sulfur monochloride was increased to 70 parts by weight in the procedure detailed above. The dark liquid product contained according to the analysis two atoms of sulfur per each tetrahydrofurfuryl radical and was therefore essentially N,N'-tetrathio-bis-N-cyclohexyl tetrahydrofurfurylamine.

*Example 2*

Substantially 159 parts by weight of N-isopropyl tetrahydrothenylamine was dissolved in 440 parts by weight of benzene and to the solution so prepared 35 parts by weight of S₂Cl₂ in 44 parts by weight of benzene was added gradually while stirring at 0–10° C. After completion of the reaction the mixture was filtered to remove by-product amine hydrochloride and the solvent removed from the filtrate by distillation. The residue, N,N'-dithio-bis-N-isopropyl tetrahydrothenylamine, was obtained in excellent yield.

*Example 3*

Substantially 78.5 parts by weight of N-n-butyl tetrahydrofurfurylamine (one-half molecular proportion) were dissolved in 460 parts by weight of trichlor ethylene and to the solution so prepared 17 parts by weight (one-eighth molecular proportion) of sulfur monochloride in 40 parts by weight of trichlor ethylene were gradually added. The reaction mixture was kept at 0–8° C. during the addition and stirred vigorously. 40 parts by weight of a 25% aqueous sodium hydroxide solution (one-fourth molecular proportion) were then added to release the remaining amine from the by-product hydrogen chloride. One-eighth molecular proportion of sulfur monochloride was then gradually added concurrently with one-fourth molecular proportion of sodium hydroxide as a 25% aqueous solution. After the completion of the reaction the organic layer was separated and washed with water to remove the salt and the solvent removed by distillation. The residue was stripped by heating under vacuum at 95–110° C. at 5–10 mm. pressure. The product was a dark red oil very soluble in common organic solvents including ether, acetone, alcohol, ethyl acetate, heptane, chloroform and benzene but insoluble in water. The yield was 94.7%. Analysis for sulfur and nitrogen gave 17.6 and 7.5% respectively. The calculated values for N,N'-dithio-bis-N-n-butyl tetrahydrofurfurylamine are 17.02% sulfur and 7.45% nitrogen.

While the invention has been described and illustrated by reference to many specific embodiments it is to be understood that it is not limited thereto.

What is claimed is:

1. An N-thioamine of the structure

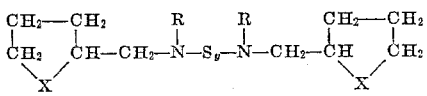

where X represents an element of group VI of the periodic table having an atomic weight less than 33, R is a member of a group consisting of alkyl radicals and a cyclohexyl radical and $y$ is an integer less than five.

2. An N-thioamine of the structure

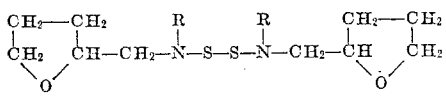

where R is selected from a group consisting of alkyl radicals and a cyclohexyl radical.

3. N,N'-dithio-bis-N-methyl tetrahydrofurfurylamine.

4. N,N'-dithio-bis-N-ispropyl tetrahydrofurfurylamine.

5. N,N'-dithio-bis-N-cyclohexyl tetrahydrofurfurylamine.

6. N,N'-dithio-bis-N-butyl tetrahydrofurfurylamine.

7. N,N'-dithio-bis-N-ethyl tetrahydrofurfurylamine.

RICHARD O. ZERBE.

REFERENCES CITED

The following references are of record in the file of this patent:

UNITED STATES PATENTS

| Number | Name | Date |
|---|---|---|
| 2,150,425 | Cramer | Mar. 14, 1939 |
| 2,416,738 | Cashion | Mar. 4, 1947 |
| 2,469,404 | Patrick | May 10, 1949 |